Patented May 29, 1934

1,960,631

UNITED STATES PATENT OFFICE 1,960,631

TREATMENT OF HYDROCARBON GASES

Vladimir Ipatieff, Chicago, Ill., assignor to Universal Oil Products Company, Chicago, Ill., a corporation of Delaware No Drawing. Application November 18, 1932.
Serial No. 643,292

4 Claims. (Cl. 196—10)

This invention relates more particularly to the treatment of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum, in gas making processes and as by-products in various chemical industries. In general they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight. In most instances this instability is a disadvantage, particularly in the case of cracked hydrocarbon oil distillates which are of suitable boiling range to permit their use in internal combustion engines, since the polymers which develop on storage are of a gummy character and impart color to the oil.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinc constituents. The manufacture of secondary alcohols such as iso-propyl alcohol and others by first absorbing the corresponding olefins in cracked gases in sulfuric acid and then hydrolyzing the acid esters has been undertaken to a limited extent. The olefins present in cracked hydrocarbon mixtures of gasoline boiling range are of moderately high anti-knock value, but a certain percentage of these is too highly unsaturated, and these must be removed by chemical treatment, usually with sulfuric acid to insure proper stability of the gasoline under storage conditions.

The present process provides for more effectively utilizing the olefinc constituents of commercial hydrocarbon mixtures particularly those occurring in the gases from oil cracking processes to produce valuable derivatives therefrom and it may also be applied to individual olefins produced by special chemical methods or by fractionation of mixtures.

In one specific embodiment the invention comprises the treatment of normally gaseous olefinic hydrocarbons with phosphoric acid at temperatures between 50° C. and 200° C. to controllably produce polymers therefrom which are utilizable as constituents of motor fuel.

To assist in developing the exact character of the invention the following table is introduced, which gives the formulas and boiling ranges of some of the lower molecular weight olefins:

| Compounds | Formula | Boiling point ° C. |
|---|---|---|
| Ethylene | $CH_2=CH_2$ | $-105°$ |
| Propylene | $CH_3CH=CH_2$ | $-48°$ |
| Ethyl ethylene | $CH_3CH_2CH=CH_2$ | $-5°$ |
| Plane-sym. / Axial-sym. } dimethyl ethylene | $CH_3.CH=CH.CH_3$ | $+1°$ / $+2.5°$ |
| Unsym. dimethyl ethylene | $(CH_3)_2C=CH_2$ | $-6°$ |
| n-propyl ethylene—α-amylene | $CH_3CH_2CH_2CH=CH_2$ | $+39°$ |
| Isopropyl ethylene—α-isoamylene | $(CH_3)_2CH.CH=CH_2$ | $+21°$ |
| Sym. methyl ethyl ethylene—β-amylene | $CH_3.CH_2.CH=CH.CH_3$ | $+36°$ |
| Unsym. methyl ethyl ethylene—γ-amylene | $\begin{smallmatrix}CH_3\\CH_3\end{smallmatrix}\!>\!C=CH_2$ | $+31°$ |
| Trimethyl ethylene—β-isoamylene | $(CH_3)_2C=CH.CH_3$ | $+36°$ |
| Tetramethyl ethylene | $(CH_3)_2C=C(CH_3)_2$ | $+73°$ |

The boiling points given in the table indicate that the four carbon atom members are gaseous at ordinary temperatures and that the five carbon atom members may readily exist in minor proportions in commercial gas mixtures, such as the cracked hydrocarbon mixtures with which the present invention is specially concerned.

The present process is particularly directed to the production of dimers from mono-olefins, particularly such olefins whose dimers boil between the approximate range of commercial motor fuel, say, for example, from 100 to 400° F. It has been found that the dimers of propylene, the butylenes and amylenes all boil within this range and furthermore that these compounds have unusually high anti-knock characteristics. The following table shows the approximate boiling points of the dimers of propylene, butylenes, amylenes and hexylenes which all occur in appreciable quantities in the gases from oil cracking processes.

Boiling points of olefin dimers

|  | °F. |
|---|---|
| Hexylene | 155 |
| Octylene | 255 |
| Decylene | 323 |
| Dodecylene | 417 |

Ethylene is substantially unaffected by phosphoric acid under the preferred conditions of operation to be later described.

Polymers of higher molecular weight than the di-molecular compounds are of too high boiling point to be used in commercial gasolines and the end products of too extensive polymerization are resinous pitchy solids which are entirely unsuitable. By using phosphoric acid according to the process of the present invention and maintaining regulated temperatures usually of the order of 50 to 60° C. there is a very small tendency for the polymerization reactions to proceed past the formation of the desired di-molecular compounds. Concentrated phosphoric acid of commercial grade may be employed and in some instances, particularly where the concentration of olefins is low in the gas mixture, the temperature may be raised considerably above 60° C., sometimes as high as 200° C. so that the desired reactions are accelerated and yet there is no undue formation of undesirably heavy polymers.

Below is given a tabulation of the known acids of phosphorus along with their melting points and temperatures of decomposition:

Acids of phosphorus

| | | | M.P.°C. | Dec.°C. |
|---|---|---|---|---|
| Hypophosphorus | $H_3PO_2$ | | 26.5 | Above. |
| Orthophosphorus | $H_3PO_3$ | $P_2O_3.3H_2O$ | 70.0 | 200. |
| Pyrophosphorus | $H_4P_2O_5$ | $P_2O_3.2H_2O$ | 38.0 | 130. |
| Hypophosphoric | $H_4P_2O_6$ | $P_2O_4.2H_2O$ | 55.0 | 70. |
| Metaphosphoric | $HPO_3$ | $P_2O_5.H_2O$ | Sublimes. | |
| Pyrophosphoric | $H_4P_2O_7$ | $P_2O_5.2H_2O$ | 61 | |
| Orthophosphoric | $H_3PO_4$ | $P_2O_5.3H_2O$ | 38.6 | Loses ½H₂O at 213. |

Of those listed the use of the more ordinary and stable acids is preferred, to-wit—the orthophosphoric acid $H_3PO_4$ and the orthophosphorous acid $H_3PO_3$, these being used alternatively in different cases though without identically equivalent results.

In operating upon particular gaseous olefins or mixtures thereof such as are encountered in commercial hydrocarbon gases, the simplest mode of operation consists in bubbling the gas mixture through a stationary body of acid of regulated strength using cooling coils or precooled gases to keep down the temperature rise if this is shown to be necessary. When operating with more or less pure olefins or gas mixtures of high olefin content, an advantage is sometimes gained in blending the mixture with some inert gas such as hydrogen or nitrogen to assist in controlling the rate of reaction. Obviously, continuous counterflow treatments may be employed as these are known in the art, and in such cases the gas mixture may be passed upwardly countercurrent to descending streams of acid in towers containing filling or packing material or regularly spaced trays to assist in subdividing the stream of acid. The polymerized olefins will appear as a layer upon the surface of the acid in the case of the first mentioned batch method of treatment, from which they may be removed continuously or intermittently. When employing the countercurrent tower operation, liquid will be recovered from above the acid after settling in intermediate accumulators.

Satisfactory results are usually obtainable when operating at substantially atmospheric pressures though the process is not limited to any particular pressure range and superatmospheric pressures may be employed to increase the capacity of any type of treating plant and accelerate the reactions of polymerization.

A marked advantage in the use of phosphoric acid resides in the fact that very little solution of original olefins or their polymers occurs so that the consumption of acid is small and a given amount may be used repeatedly without the necessity for purification steps which must be employed in removing sludge products from such powerful polymerizing and condensing agents as sulfuric acid. Neither phosphoric nor phosphorous acid has any pronounced oxidizing action under the preferred conditions of treatment so that condensation reactions due to removal of hydrogen or abstraction of water are substantially absent.

In applying the invention to practice the apparatus used and the conditions of operation chosen in respect to temperature, pressure and proportioning of reacting constituents will be varied to suit individual cases. When the process is used to polymerize individual olefins or mixtures of known composition, it is possible to so regulate the treatments that compounds or mixtures of compounds of very definite composition may be produced. For example, any one of the olefins given in the first table (with the exception of ethylene) may be polymerized to form the corresponding dimer with a minimum production of undesirable by-products from side reactions, to produce dimers of high anti-knock characteristics suitable for blending with gasolines of inferior knock rating or other uses.

As an example of the results obtainable by polymerizing the olefins occurring in a gas from an oil cracking process to produce valuable anti-knock blending fluid, the following case may be cited. In the cracking of a mixture of Mid-Continent residuum and heavy distillates, a gas mixture having the following composition may be produced:

Analysis of gas from cracking

| | Percent |
|---|---|
| Hydrogen | 7 |
| Methane | 20 |
| Ethane | 13 |
| Ethylene | 10 |
| Propane | 6 |
| Propylene | 24 |
| Butanes | 2 |
| Butylenes | 8 |
| Pentane | 8 |
| Amylenes | 2 |

This gas mixture may be continuously contacted with concentrated phosphoric acid in a treating tower at a temperature of approximately 60° C. and atmospheric pressure and a liquid may be recovered in an amount of 8 gallons per 1,000 cubic feet of gas mixture having the following properties:

*Properties of recovered liquid*

| | |
|---|---|
| Gravity °A. P. I. | 67.5 |
| Initial boiling point °F | 135° F. |
| 50% point | 205° F. |
| End boiling point | 380° F. |
| Octane number | 94 |

After neutralizing and washing this liquid it has a water white color and can be blended directly with the gasoline produced by the cracking process. In the case of a process producing 21 gallons or 50% by volume of gasoline based on charging oil and 500 cubic feet of gas per barrel having the above given composition, it is evident that the overall yield from the cracking process is increased by about 12%, which more than counterbalances the cost of operating and the acid used.

The character of the invention and its commercial value will be readily apparent from the preceding disclosure and the numerical data presented, though its scope is not to be considered as unduly limited by the particular descriptive data or the figures given.

I claim as my invention:

1. A process for producing liquid hydrocarbons boiling within the gasoline range from normally gaseous olefins of more than two carbon atoms which comprises polymerizing the olefins at a temperature between 50° C. and 200° C. in the presence of an acid of phosphorus selected from the group consisting of orthophosphoric and orthophosphorous acids.

2. A process for producing liquid hydrocarbons boiling within the gasoline range from normally gaseous olefins of more than two carbon atoms which comprises polymerizing the olefins at a temperature between 50° C. and 200° C. in the presence of orthophosphoric acid.

3. A process for producing liquid hydrocarbons boiling within the gasoline range from the incondensible gases formed in the cracking of hydrocarbon oils and containing normally gaseous olefins of more than two carbon atoms, which comprises polymerizing such olefins by subjecting the cracked gases to a temperature between 50° C. and 200° C. in the presence of an acid of phosphorus selected from the group consisting of orthophosphoric and orthophosphorous acids.

4. A process for producing liquid hydrocarbons boiling within the gasoline range from the incondensible gases formed in the cracking of hydrocarbon oils and containing normally gaseous olefins of more than two carbon atoms, which comprises polymerizing such olefins by subjecting the cracked gases to a temperature between 50° C. and 200° C. in the presence of orthophosphoric acid.

VLADIMIR IPATIEFF.